United States Patent [19]
Komasaka et al.

[11] Patent Number: 5,958,062
[45] Date of Patent: Sep. 28, 1999

[54] CLIENT/SERVER SYSTEM AND COMPUTER SYSTEM

[75] Inventors: Toshio Komasaka; Takashi Miyamoto, both of Tokushima; Ichizou Mikami, Suita, all of Japan

[73] Assignee: Fujitsu Limited, Kawasaki, Japan

[21] Appl. No.: 08/958,913

[22] Filed: Oct. 28, 1997

[30] Foreign Application Priority Data

Mar. 19, 1997 [JP] Japan ................................. 9-067005
Mar. 19, 1997 [JP] Japan ................................. 9-067006

[51] Int. Cl.$^6$ ................................................. G06F 11/00
[52] U.S. Cl. .................................................. 714/1; 714/15
[58] Field of Search .................................. 714/1, 2, 3, 4, 714/5, 6, 7, 10, 11, 13, 14, 15, 16, 20, 25, 31, 36, 39; 395/500.02, 500.05

[56] References Cited

U.S. PATENT DOCUMENTS

| | | | |
|---|---|---|---|
| 5,634,052 | 5/1997 | Morris | 395/601 |
| 5,748,882 | 5/1998 | Huang | 395/184.01 |
| 5,765,151 | 6/1998 | Senator | 707/8 |
| 5,768,568 | 6/1998 | Inui et al. | 395/500 |
| 5,787,244 | 7/1998 | Hiratsuka et al. | 395/182.14 |
| 5,799,147 | 8/1998 | Shannon | 395/182.04 |

FOREIGN PATENT DOCUMENTS

8-272643  10/1996  Japan .

*Primary Examiner*—Robert W. Beausoliel, Jr.
*Assistant Examiner*—Nadeem Ibal
*Attorney, Agent, or Firm*—Staas & Halsey

[57] ABSTRACT

Even when a client unit 2 can not connect with a server unit 1, by comparing a system information held by a system information file 23 with the present status, a self-diagnosis is performed by a self-maintenance system file 24 of the client unit 2 itself, and as a result, when abnormality has occurred, the client unit 2 independently carries out recovering processing in accordance with its own backup file 25. When it is possible to connect with the server unit 1, the necessary information is obtained from the server unit 1 to carry out recovering processing and system update processing. By this processing, the following problem is settled: In case of an obstacle to the client in the conventional client/server system which is based on the premise of it being normally connectable with the server, when it becomes impossible to connect to a server, the client is prevented from downloading from the server the files necessary for maintenance processing.

5 Claims, 7 Drawing Sheets

CLIENT/SERVER SYSTEM AND COMPUTER SYSTEM

BACKGROUND OF THE INVENTION

The present invention relates to a client/server system, and more particularly, to an automatic maintenance technique for automatically maintaining the client itself led by the client. Furthermore, the invention relates to a computer system to serve as a client in such client/server system.

Furthermore, the present invention relates to a computer system which, when used in a stand-alone state, when the user designates according to necessity at an optional time such as starting time, carries out self-maintenance.

In recent years, with the improvement in the performance of the personal computers, a client/server system has come to be used in general. Now, in the client/server system, initiated by the user's mis-operation or simple mis-setting of environmental conditions, the troubles affecting the whole network system are apt to occur. In such a case, it becomes impossible for the server to give maintenance instructions to the client. In such a case, during the time until the trouble is dissolved, it becomes impossible to perform the maintenance work itself, and there is an apprehension that the system goes into down state. As such apprehension becomes larger according to the increase in the number of the clients to be connected to the server, as the network system becomes larger, the loss in the economical aspect cannot be disregarded.

Furthermore, in the system like a client/server system to use a plurality of personal computers as clients and server, infection with computer virus has become a serious problem in recent years. Namely, when computer virus comes into one of the plural personal computers as clients of client/server system, the virus infects all clients and server through the network system, thereby inducing a grave loss. For this reason, in order to operate the client/server system comfortably, it is a matter of great importance that the system maintenance can be efficiently performed.

With respect to the maintenance of each client in the conventional client/server system, in general a so-called top-down system is adopted in which the user stores the information necessary for maintenance on the server so that the maintenance instructions are sent from the server. However, according to such a top-down system, basically the maintenance instructions are issued simultaneously to all clients connected to the server, so that the excessive loads are applied to the server and the transmission route on each maintenance work, and as all the clients are simultaneously put into non-operated condition while the maintenance work is in progress, there is a drawback that the capacity of the whole system is lowered.

As reviewed above, according to the conventional client/server system, maintenance work is required, and the time required for the work depends largely on the maintenance capacity of the server or the communication capacity of the transmission route. Furthermore, in case of a trouble, because the search into the cause thereof depends on the ability of the user or the maintenance worker, no quick recovery of the system can be expected, thereby troubling the maintenance worker.

In view of the situation as above, the inventors of the present application previously filed an application on an invention: Japanese Patent Application Laid-Open No. 8-272643(1996). According to the invention of Japanese Patent Application Laid-Open No. 8-272643(1996), briefly, the client is caused to be provided with the self-maintenance capacity, so that the individual client shall carry out self-diagnosis at the time of the switching ON of power, and only in case of the occurrence of trouble, only the necessary files are downloaded from the backup system of the client stored on the server to make self-recovering. In this manner, by having the individual client carry out maintenance of its own, a design is made that the loads of the server and the transmission route are reduced, probability of occurrence of system-down is decreased, and the capacity of the whole system is improved.

However, according to the invention of Japanese Patent Application Laid-Open No. 8-272643(1996), the system is run on the premise that the server, network, and network connection apparatus are normal. Accordingly, when a trouble occurs with the client and there are troubles simultaneously on the server, network, and network connection apparatus, then such a problem occurs that it becomes impossible for the client to make download of a file necessary for the maintenance from the server.

In the conventional client/server system, though it is a matter of course with a server, the situation where routine movement of the client takes place has not been considered. However, in recent years, it has come to be common in the enterprises that the workers carry personally portable personal computers for business use to use them as stand-alone-machines, thereby showing various kinds of information to the customers, and inputting the information obtained from the customers on the spot, and in the office the client is incorporated in a client/server system and used as a client for the network system, so that various kinds of business information can be received and the documents necessary for the business are exchanged as electronic information data. In such a style of use, for example, there may be a possibility for a trouble on the part of the client when the user is outside the office under the condition impossible to have connection with the server. In such a case, naturally the client cannot obtain the information necessary for maintenance from the server, and it cannot recover from the disorder, with the result that the business operation is inconvenienced.

The present invention has been made in the light of the situation as above. Straightforwardly, the first object of the invention is to provide a client/server system in which the back-up files necessary for the maintenance of the client are kept on both the server and the client, and in the case where the client carries out self-maintenance, when it is possible to be connected with the server, the back-up file is downloaded from the server, and version-up of the software is made to expect to make the whole resource common, and when it is impossible to be connected with the server, the back-up file held by itself is used to carry out maintenance independently, and to provide a computer system to become a client in such a system.

Further, in recent years, on one hand the individual computer system, namely, a personal computer, has come to possess multifarious functions with improvement of its performance, and improvement in operability and simplification have been promoted as represented by GUI (Graphical User Interface). However, along with it, in the inside of the system, hardware, software, etc. have become high leveled and complicated, and more time is required for their maintenance. As a result, starting from the user's mis-operation or a simple mistake in environmental setting or the like, a grave trouble may be induced to produce personal and time losses, and making the loss in economical aspect non-negligible. For this reason, in order to use the computer system represented by a personal computer comfortably, it is quite important that the system maintenance can be efficiently carried out.

Now, with respect to the maintenance in the conventional computer system, the user previously collects the information necessary for maintenance as backup information, so that the system recovering is made, as necessary, based on the backup information. However, in the recent high leveled and sophisticated computer systems as described above, because of the extreme enlargement of the system, it requires time directly proportional to the size of the system for the recovering work of the system based on the backup information, so that there is a problem that the user is caused to wait on each occasion.

Alternatively, there is a method to carry out the above recovering work by utilizing the environment setting function of the software. In such a case, it is necessary to have recovering made after specifying trouble by the user. Therefore, the user is required to have appropriate knowledge and ability, and the time required for recovering is dependent on the user's capacity.

As reviewed above, in the conventional computer system, the efficiency of the maintenance work is ruled by the capacity of the computer system itself, and time is required according to the size of the system. Furthermore, in case of the recovering work to be carried out after specifying the cause of the trouble, the result depends largely on the capacity of the user or the maintenance worker.

The present invention has been made in the light of the situation as above. Straightforwardly, the second object of the invention is to provide a computer system in which, at an optional time point in starting the computer system, the computer itself self-diagnoses the operating environment (hardware, firmware, software), and in case of abnormality as the result thereof, only the abnormal part is recovered according to the judgment of the computer system itself, thereby making it possible to reduce the time necessary for the maintenance work.

BRIEF SUMMARY OF THE INVENTION

A client/server system according to the present invention in which at least one client unit having software installed in a hardware is connected in separable manner by network connecting means to a network to which at least one server unit is connected, wherein the server unit comprises storing means for storing a backup information of an operating environment of the client unit, and an update information of whole system, and the client unit comprises: backup data holding means for holding backup data of an operating environment of the unit itself including the hardware and software; system information holding means for holding an information of the operating environment of the unit itself of the normal state; diagnosing means for, at a predetermined time, diagnosing the operating environment of the unit itself and the network by comparing them with the information of the normal state held by the system information holding means; network cutting-off means for cutting off the unit itself from the network when the diagnosing means diagnoses that abnormality has occurred in the network, server unit or network connecting means, and self-maintaining means, when the diagnosing means diagnoses that abnormality has developed in the hardware, for cutting off the unit itself from the network by the network cutting-off means, when the diagnosing means diagnoses that abnormality has occurred in the software and the separation from the network by the network cutting-off means has been made, for self-recovering the operating environment according to the contents of the backup data holding means, and when the diagnosing means diagnoses that abnormality has occurred in the software and the separation from the network by the network cutting-off means has not been made, for self-recovering the operating environment referring to the backup information for the client and system update information stored in the storing means of the server unit.

In the client/server system of the present invention as above, when abnormality has occurred in the client, if all the network, server unit and network connecting means are normal and the condition permits to obtain support of the server, then the server's support is obtained and the recovering processing is made according to the backup information, and also the system update processing is made according to the system update information, and when any one of the network, server unit and network connecting means is not normal and no support of the server can be obtained, then the recovering processing is made independently according to the content of its own backup data holding means.

Furthermore, a computer system according to the present invention having software installed in hardware, and being connectable with a network with which another computer is connected, comprises: backup data holding means for holding backup data of an operating environment of its own including the hardware and software; system information holding means for holding an information of the operating environment of its own of the normal state; diagnosing means for, at a predetermined time, diagnosing the operating environment of its own by comparing it with the information of the normal state held by the system information holding means; and self-maintaining means for self-recovering the operating environment according to the content of the backup data holding means when the diagnosing means judges that an abnormality has occurred in the software, and the system is not connected with the network.

According to the computer system of the present invention as described above, in case abnormality has occurred under the condition not connected with the network, the system independently carries out recovering processing according to the contents held by its own backup data holding means.

Furthermore, a computer system according to the present invention, comprises: backup data holding means for holding backup data of its own operating environment; system information holding means for holding an information of its own operating environment of the normal state; diagnosing means for, at an optional time, diagnosing the operating environment of its own by comparing it with the information held by the system information holding means; and self-maintaining means for self-recovering the operating environment according to the content of the backup data holding means applicable only to the part of abnormality when the diagnosing means judges that the abnormality has occurred.

According to the computer system of the present invention as above, the computer system itself carries out self-diagnosis to prepare maintenance information, and carries out only the necessary maintenance according to the maintenance information.

Furthermore, a computer system according to the present invention having software installed in hardware, comprises: software holding means for holding the software; backup data holding means for holding backup data of an operating environment of its own including the hardware and software; system information holding means for holding an information of the operating environment of its own; diagnosing means for, at an optional time, diagnosing the operating environment on its own by comparing it with the information held by the system information holding means; selecting means for selecting either the not updated state or the after-updated state when the diagnosing means diagnoses that the software is updated; and self-maintaining means for updating the contents of the system file information holding means according to the contents of the software holding means, and updating the contents of the backup data holding means to meet the contents of the updated operating environment when updating of the software is selected by the selecting means, and for self-recovering the operating environment according to the content of the backup data holding means when updating of the system file is not selected by the selecting means.

In such computer system of the present invention, even in case of the change of the operating environment, e.g., in case of updating of a system file on installation of a new software, whether to select the state or to reinstate to the previous state can be selected. Accordingly, in the event of any new problem occurred by installation of new software, it is possible to reinstate immediately to the original system condition, or in case of no problem, the computer may be used in the new system condition.

Furthermore, a computer system according to the present invention having software installed in hardware, comprises: software holding means for holding the software; backup data holding means for holding backup data of an operating environment of its own including the hardware and software; system information holding means for holding an information of the operating environment of its own; diagnosing means for, at an optional time, diagnosing whether or not abnormality has occurred by comparing the operating environment of its own with the information held by the system information holding means, and whether the software is updated or not; selecting means for selecting either the not updated state or the after-updated state when the diagnosing means diagnoses that the software is updated; and self-maintenance means for updating the contents of the system file information holding means according to the contents of the software holding means, and updating the contents of the backup data holding means to meet the contents of the updated operating environment when updating of the software is selected by the selecting means and the diagnosing means diagnoses that abnormality has occurred, and for self-recovering the operating environment according to the content of the backup data holding means applicable only to the part which necessitates recovering when the updating of the system file is not selected by the selecting means and the diagnosing means diagnoses that abnormality has occurred.

In such computer system of the present invention, even when the change of the operating environment, e.g., in case of updating of a system file on installation of a new software, whether to select the state or to reinstate to the previous state can be selected. Accordingly, in either state of installation of a new software or a state of recovery to the former state, the computer itself may carry out self-diagnosis to prepare maintenance information and effect only the necessary maintenance according to the maintenance information.

The above and further objects and features of the invention will more fully be apparent from the following detailed description with accompanying drawings.

DESCRIPTION OF THE PREFERRED EMBODIMENTS

Hereinafter, the present invention is described in detail based on the drawings to show its embodiments. In the first place, explanation is given on the first invention which relates to the client/server system and the computer system which should serve as the client thereof.

Figure 1:
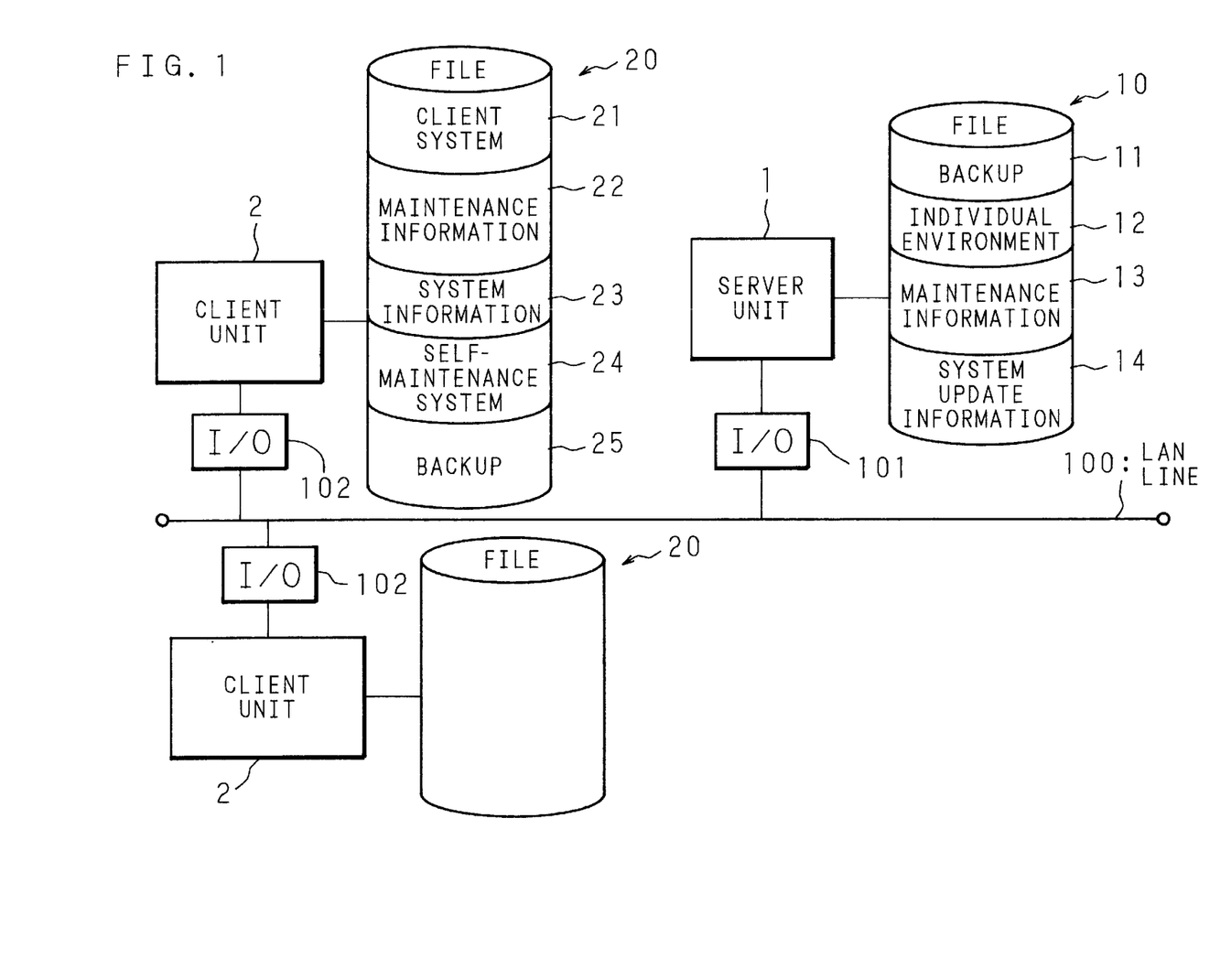
FIG. 1 is a schematic diagram showing the whole constitution example of the client/server system according to the present invention.

FIG. 1 is a schematic diagram showing the whole constitution example of the client/server system according to the first invention, and its client unit is the computer system of the present invention.

In FIG. 1, the reference numeral 100 shows a LAN line, reference numerals 1 and 2 show a server unit and a client unit, respectively, which are all connected to the LAN line 100 to constitute a network system. To one LAN line 100, it is possible to connect a plurality of server units 1 and client units 2, but in this embodiment, shown is an embodiment wherein one server unit 1 and two client units 2 are connected to the LAN line 100.

The server unit 1 and the client unit 2 are each an ordinary a personal computer furnished with the hard ware such as a CPU, memory, disk unit (hard disk, flexible disk, etc.), printer, display, keyboard, mouse, etc. in which firmware is installed. To the respective unit, the large capacity storing media 10, 20 utilizing hardware such as a hard disk, magnetic tape, etc. are connected and software is installed therein.

The server unit 1 is connected to the LAN line 100 by an I/O interface 101 as hardware, and the client unit 2 by the I/O interface 102, respectively.

In the storing medium 10 of the server unit 1, file formed information such as a backup file 11 of the client, individual environment file 12 of the client, maintenance information file 13, system update information file 14, etc are stored.

In the backup file 11, data for backing up the files of the client system common with each client unit 2 is stored. In the individual environment file 12, data for backing up the files of the client system which are individually necessary for each client unit 2 is stored. In the maintenance information file 13, maintenance information on the operating environment of each client unit 2, i.e., error information which necessitates maintenance is stored. In the system update information file 14, data of update information of the operating environment of each client unit 2, i.e., data to specify the version of respective client system is stored.

In the storing medium 20 of the client unit 2, file formed information such as a client system file 21, maintenance information file 22, system information file 23, self-maintenance system file 24, backup file 25, etc. are stored.

In the client system file 21, various software and firmware necessary for respective client unit 2 are stored. In the maintenance information file 22, an abnormal information concerning the operating environment of respective client unit 2 is stored. In the system information file 23, an ordinary operating environment of respective client unit 2, in other words, operating environment of the normal state is stored. In the self-maintenance system file 24, a software for the self-maintenance of the individual client unit 2 which characterizes the present invention is stored. In the backup file 25, data for backing up its own client unit 2 is stored.

Figure 2A:
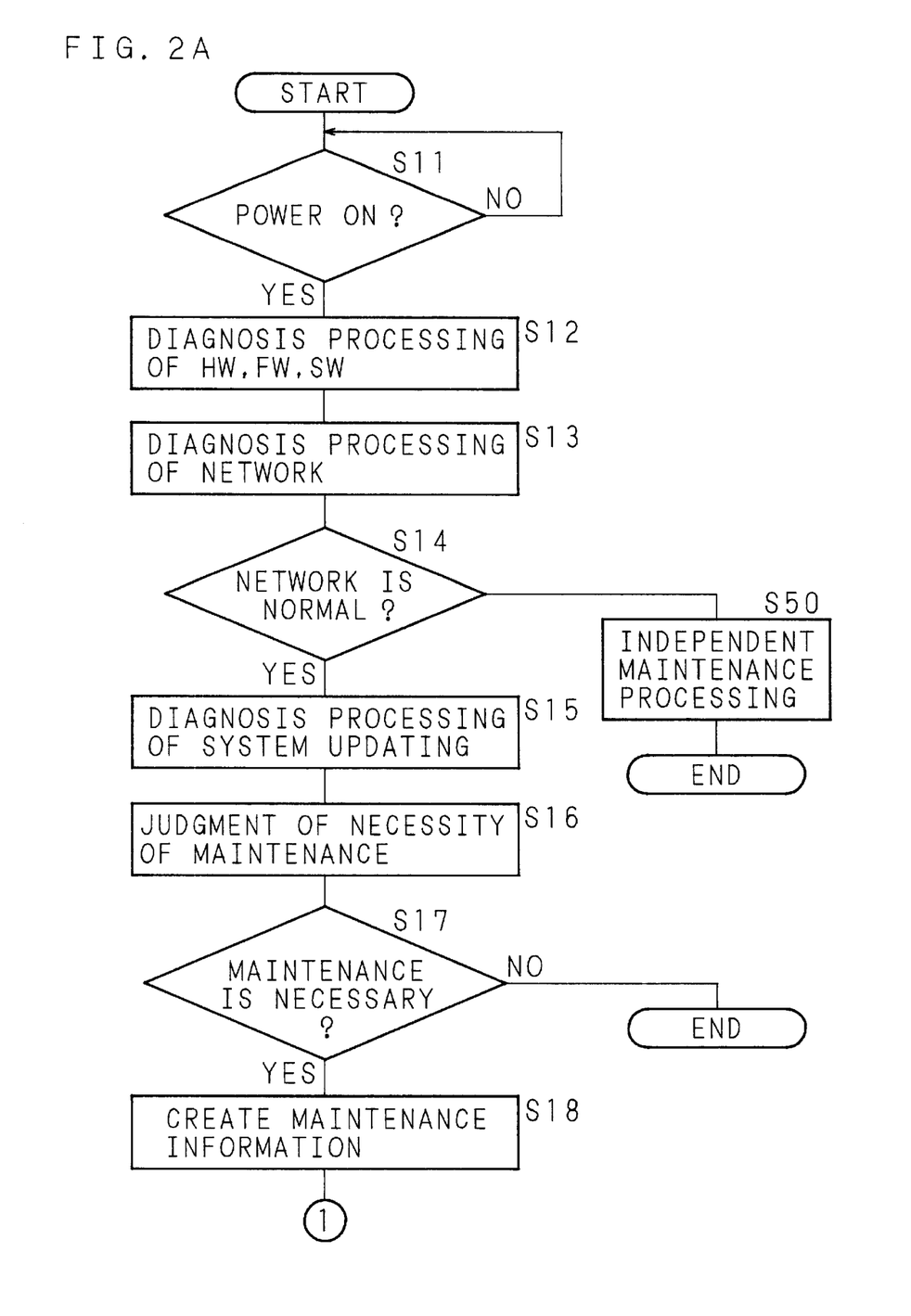
FIG. 2A is a flow chart showing the procedure for the self-maintenance by the client unit in the client/server system according to the present invention.
Figure 2B:
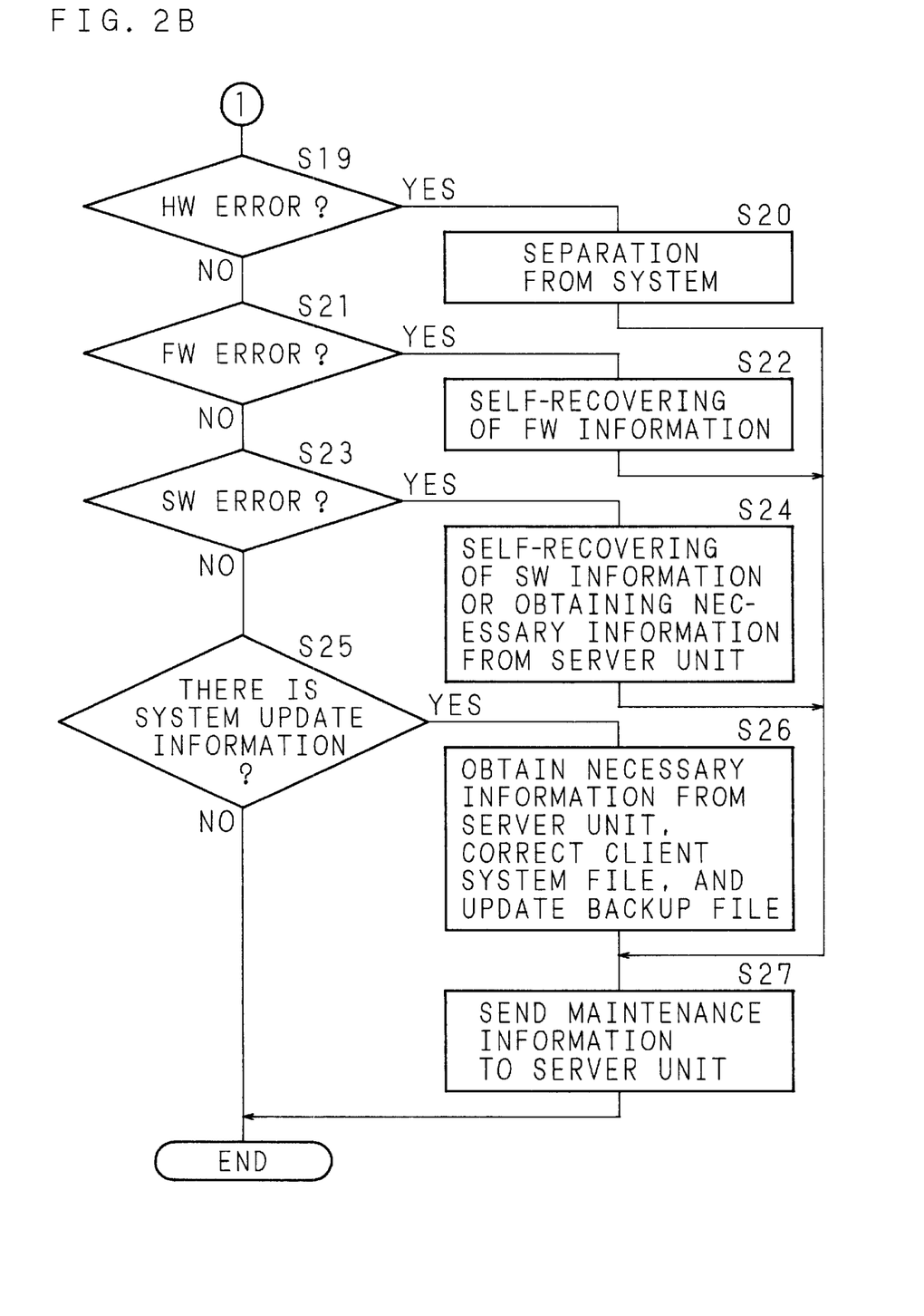
FIG. 2B is a flow chart showing the procedure for the self-maintenance by the client unit in the client/server system according to the present invention.
Figure 3:
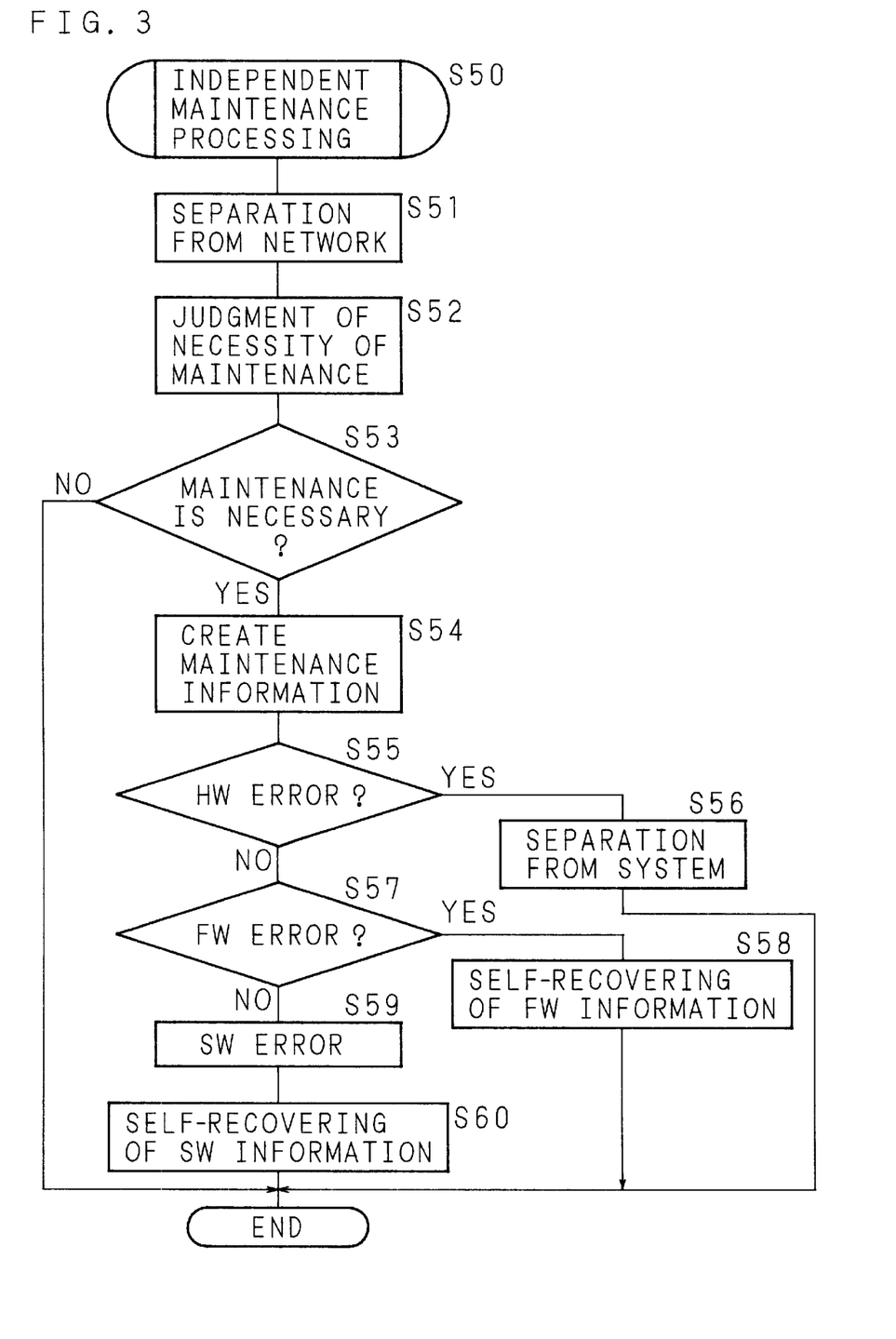
FIG. 3 is a flow chart showing the procedure for the self-maintenance by the client unit in the client/server system according to the present invention.

Next, with respect to the operation in maintenance of the client/server system of the present invention, the processing sequence by software for self-maintenance which is installed as the self-maintenance system file 24 in individual client unit 2 is explained with reference to the flow charts of FIG. 2A, FIG. 2B and FIG. 3.

Now, when power of a certain client unit 2 is put in to start the system (step Sll), software for carrying out self-maintenance stored in the self-maintenance system file 24 of respective client unit 2 is activated. In this embodiment, it is designed for the client unit 2 to carry out a self-maintenance processing at the activating time by power ON. However, without being limited to the activating time, any time may be selected if maintenance processing is workable.

First, hardware (HW), firmware (FW), and software (SW) are diagnosed (Step S12). Concretely, diagnoses are made as to whether various hardware constituting the client unit 2, i.e., a CPU, memory, disk unit (hard disk, flexible disk, etc.), printer, display, keyboard, mouse, etc. are normal or not. In such a case, however, diagnosis of the hardware relating to the network including the I/O interface 102 is not made then but in the step S13 to be described later. Further, diagnosis is made as to whether or not any abnormality or change (deletion, new preparation and change) has occurred to the system environment of the client unit 2, i.e., to the files of software, firmware, etc., by comparing the ordinary, i.e., normal time, system information held by the system information file 23 with the contents of the client system file 21 by the self-maintenance system file 24.

Next, the diagnosis processing of the network is carried out (Step S13). Concretely, diagnoses are made as to whether the I/O interface 102 of the client unit 2 itself with the LAN line 100 is normal or not, the LAN line 100 and the server unit 1 are normal or not. As a result, when it is judged that there is abnormality in the network (in Step S14, "NO"), then the client unit 2 carries out an independent maintenance processing as described later only by itself (Step S50). This situation includes the case where the client unit 2 is separated from the network not because of network abnormality but intentionally, in other words, the case where it is used in stand-alone state.

When it is judged in Step S13 that there is no abnormality in the network (in Step S14, "YES"), the client unit 2 starts maintenance processing under support of the server unit 1. First, the client unit 2 carries out system update diagnosing processing (Step S15). Concretely, the client unit 2 reads out the system update information file 14 of the server unit 1 through the LAN line 100 to examine the existence or non-existence of the system update information. The system update information includes the information in the case where there is any change in the client/server system, e.g., installation of new software, upgrade of already installed software, new installation of hardware, etc.

According to the respective diagnosis results as above, judgment is made as to whether the maintenance is required or not (Step S16). As a result, when no maintenance is necessary (in Step S17, "NO"), the self-maintenance processing by the client unit 2 is terminated to make the system usable. However, when there is necessity for maintenance (in Step S17, "YES"), in other words, when an error has occurred, it is prepared as maintenance information (Step S18), and after it is stored in the maintenance information file 22, recovering processing in accordance with the kind of the generated error is carried out.

First, when a hardware error was found to have occurred in the diagnosis in Step S12 (in Step S19, "YES"), the client unit 2 is separated from the client/server system to which the client unit 2 belongs itself by software (Step S20). At this time, when the client unit 2 is not connected with the client/server system from the start, it becomes impossible to be connected to the client/server system. Furthermore, since it is impossible to make self-recovering to the hardware error, the self-maintenance system file 24 terminates the maintenance processing at this time.

In the diagnosis in Step S12, when a firmware error is found to have occurred (in Step S21, "YES"), namely, when, as a result of the comparison between the system information held by the system information file 23 and the content of the client system file 21, it is judged that any change is made in the file of the firmware (deletion, new making and change), then self-recovering of the firmware is made according to the contents of the backup file 25 (Step S22).

In case of a software error which was found in the diagnosis in Step S12 (in Step S23, "YES"), namely, when, as a result of the comparison between the system information held by the system information file 23 and the content of the client system file 21, it has been judged that there is a change (deletion, new making or alteration) in the file of the software, then, with respect to the one which can be self-recovered, e.g., application software, self-recovering is carried out according to the content of the backup file 25 (Step S24). Also, when there is a change in the basic software of the system, e.g., a file of the software which is hard to self-recover such as an operating system (OS), then the backup file 11 of the server unit 1 is read out through the LAN line 100 and re-installing processing is performed (Step S24). Useless files prepared by carelessness of the user or the like are deleted in this self-recovering.

Next, when there is system update information in the diagnosis in Step S15 (in Step S25, "YES"), concretely, when the version of the software stored in the client system file 21 of the client unit 2 does not agree with the version of the software stored in the backup file 11 of the server unit 1, or when the new software not stored in the client system file 21 of the client unit 2 is stored in the backup file 11 of the server unit 1, the software stored in the backup file 11 of the server unit 1 is read out through the LAN line 100 and re-installed in the client system file 21, and the contents of the backup file 25 are updated (Step S26).

Thereafter, the maintenance information previously prepared in the step S18 and stored in the maintenance information file 22 is sent to the server unit 1 through the LAN line 100 (Step S27). The server unit 1 records the maintenance information sent from the client unit 2 in the maintenance information file 13.

When there is no abnormality in the network, in the client unit 2, self-maintenance processing is practiced under support of the server unit 1 according to the above procedures. By this step, the client unit 2 is made normally operable in every working environment, namely, hardware, software and firmware, and it enters such condition in which the same version as all other client unit 2 is installed, by which the self-maintenance is terminated.

Now, when any abnormality is detected in the diagnosis processing of the network in the step S13, the client unit 2 cannot obtain support from the server unit 1 as described above, and it is required to carry out the maintenance independently. In other words, the feature of the present invention rests in the independent maintenance processing to be carried out by the client unit 2 in case of the abnormality in the network. Hereinafter, description is made on the independent maintenance processing by the client unit 2 which is shown as Step S50 in FIG. 2A, with reference to the flow chart of FIG. 3 which shows the procedure thereof.

First, the client unit 2 is separated from the network (Step S51) by the hardware, concretely from the LAN line 100 by invalidating the I/O interface 102. And, according to the result of each diagnosis in the foregoing step S12, judgment is made as to whether the maintenance is necessary or not (Step S52). As a result, when there is no necessity for maintenance (in Step S53, "NO"), the self-maintenance processing by the client unit 2 is terminated. However, when there is the necessity for maintenance (in Step S53, "YES"), the maintenance information is prepared (Step S54), and stored in the maintenance information file 22, and then the recovering processing is made according to the kind of the developed disorder.

First, when a hardware error has been found in the diagnosis of Step S12 (in Step S55, "YES"), the client unit 2 is separated from the network (Step S56) by the software.

When a firmware error has been found in the diagnosis of Step S12 (in Step S57, "YES"), i.e., when it is judged as a result of the comparison between the system information held by the system information file 23 and the contents of the client system file 21 that there is a change in the file of the firmware (deletion, new making, or alteration), self-recovering of the firmware is made according to the contents of the backup file 25 (Step S58).

When a software error has been found in the diagnosis of Step S12 (Step S59), i.e., when it is judged as a result of the comparison between the system information held by the system information file 23 and the contents of the client system file 21 that there is a change in the file of the software (deletion, new making, or alteration), self-recovering of the software is made according to the contents of the backup file 25 (Step S60).

In case of abnormality in the network, the client unit 2 practices the self-maintenance processing independently according to the backup file 25 of its own without having the support of the server unit 1 as described above. By this step, even if there is abnormality in the network, or in a stand-alone state of being separated intentionally from the client/server system, the client unit 2 independently carries out self-maintenance to become enable.

The self-maintenance independently carried out by the client unit 2 as above is of course effective in the case where there is abnormality in the above-mentioned network, and it is particularly effective in the case of using the recent portable personal computer in the office by connecting it with the network as a client unit of the client/server system, and using it as an independent computer system when the user is outside the office.

As described in detail above, according to the client/server system of the present invention, in case of occurrence of abnormality in the client, if all the network, server unit and network connecting means are normal and the condition is ready to receive support of the server, then the recovering processing is made according to the content of its own backup data holding means with support of the server, and also the update processing of the system is made according to the system update information. In case any one of the network, server unit, and network connecting means is not normal and no support of the server can be obtained, then the system independently carries out recovering processing according to the content of its own backup data holding means. Therefore, even in case any one of the network, server unit, and network connecting means is not normal, it becomes possible for the client to independently recover the abnormality.

Also, according to the computer system of the present invention which should serve as the client of the client/server system as mentioned above, in case of the occurrent of abnormality under the condition of not being connected with the network, the system independently carries out recovering processing according to the content of its own backup data holding means. Accordingly, when the system is separated from the network and used in the stand-alone state, if abnormality has occurred on self-diagnosis and as a result thereof, it becomes possible to make recovering of such abnormality independently.

Figure 4:
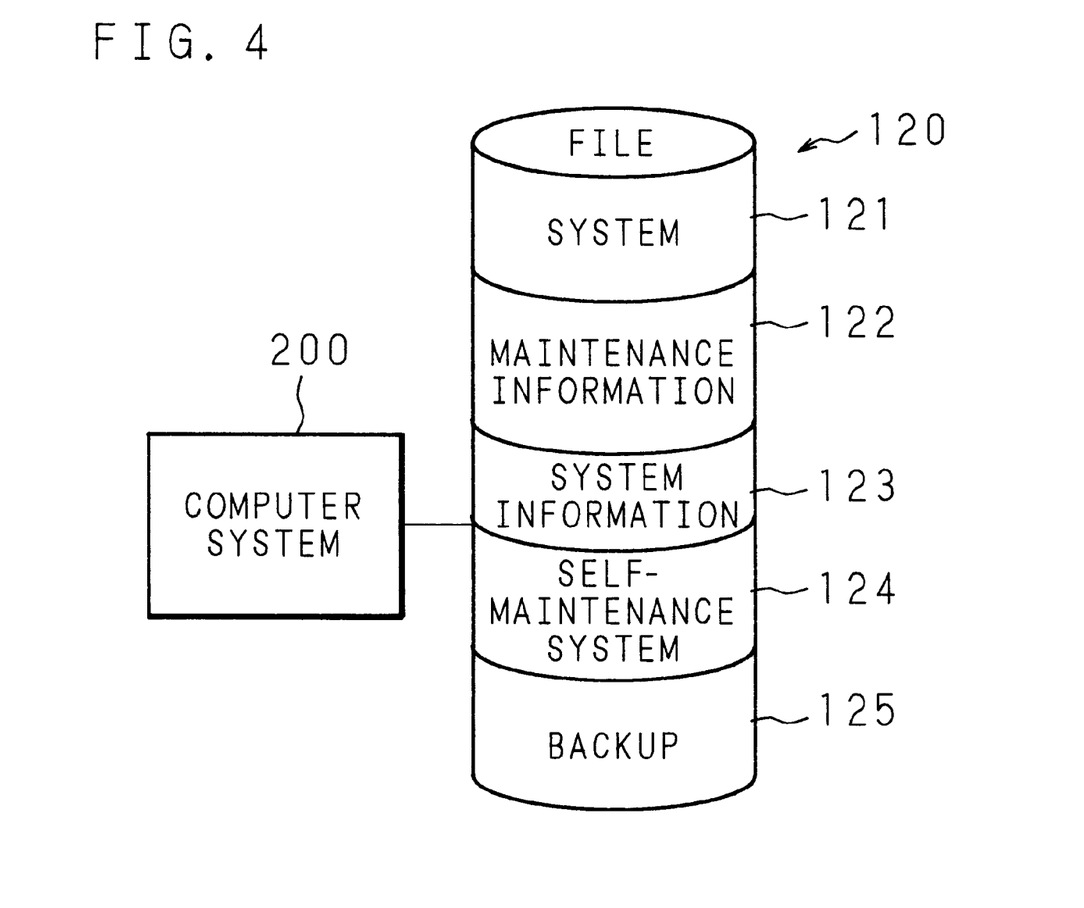
FIG. 4 is a schematic diagram showing the whole constitution example of the computer system according to the present invention.

Next, with respect to the second invention of the present invention relating to the computer system which is used independently, in other words, in a stand-alone state, description is made in reference to the schematic diagram of FIG. 4 which shows the constitution example thereof.

In FIG. 4, the reference numeral 200 shows a computer system of the present invention. As hardware, it is an ordinary personal computer equipped with the hardwares such as a CPU, memory, disk unit (hard disk, flexible disk, etc.), printer, display, keyboard, mouse, etc., with firmware installed. To the computer system 200 of the present invention, the large capacity storing medium 120 utilizing the hardware such as a hard disk, magnetic tape, etc., and storing software is connected.

In the storing medium 120 of the computer system 200 of the present invention, the file formed information such as the system file 121, maintenance information file 122, system information file 123, self-maintenance system file 124, backup file 125, etc. are stored.

In the system file 121, various software necessary for the computer system 200 are stored. In the maintenance information file 122, abnormality information concerning the operating environment of the computer system 200 is stored. In the system information file 123, the operating environment of the computer system 200 is stored. In the self-maintenance system file 124, software for self-maintenance of the computer system 200 is stored. In the backup file 125, data for backing up the computer system 200 itself is stored.

Figure 5A:
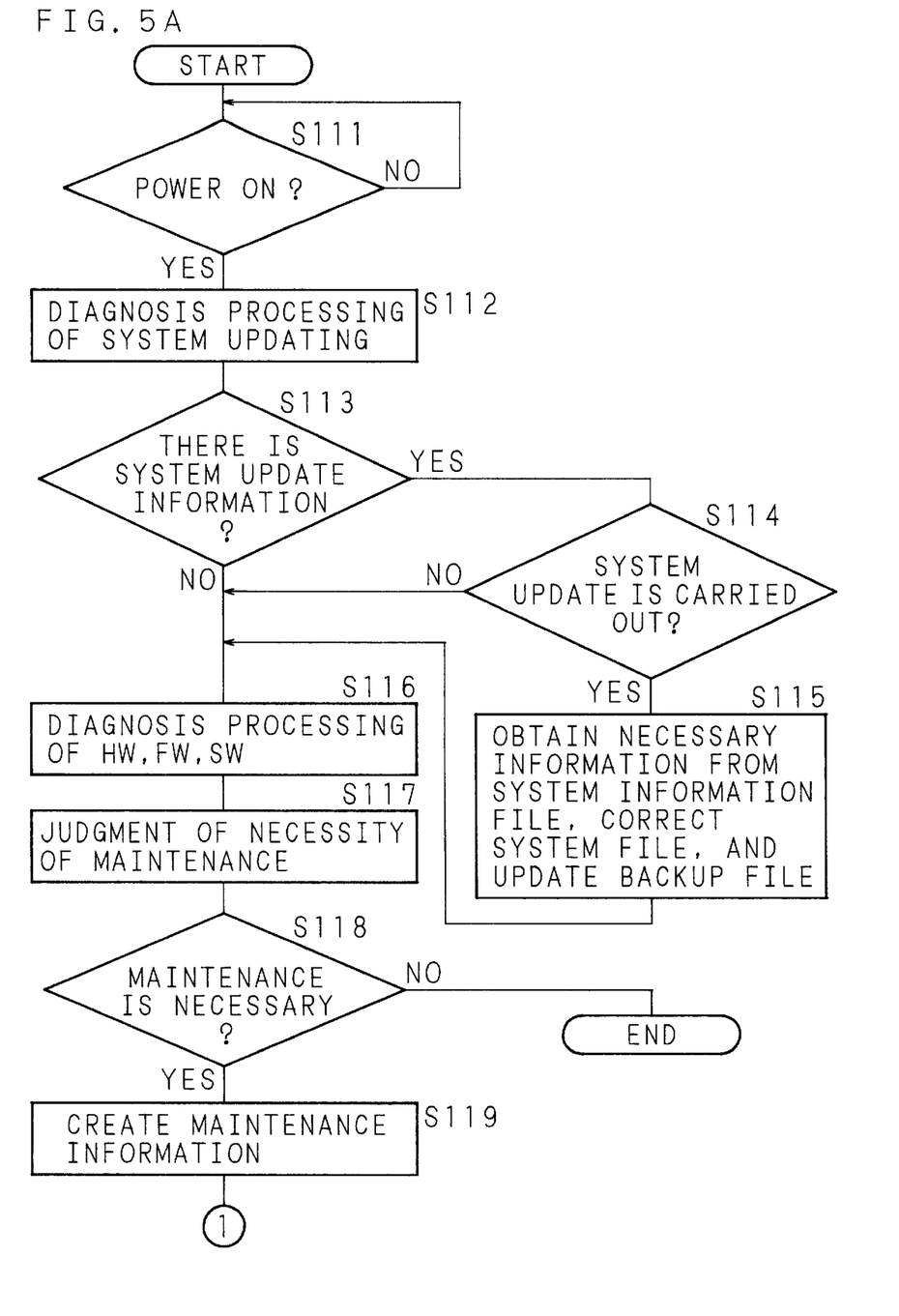
FIG. 5A is a flow chart showing the procedure for the self-maintenance by the computer system according to the present invention.
Figure 5B:
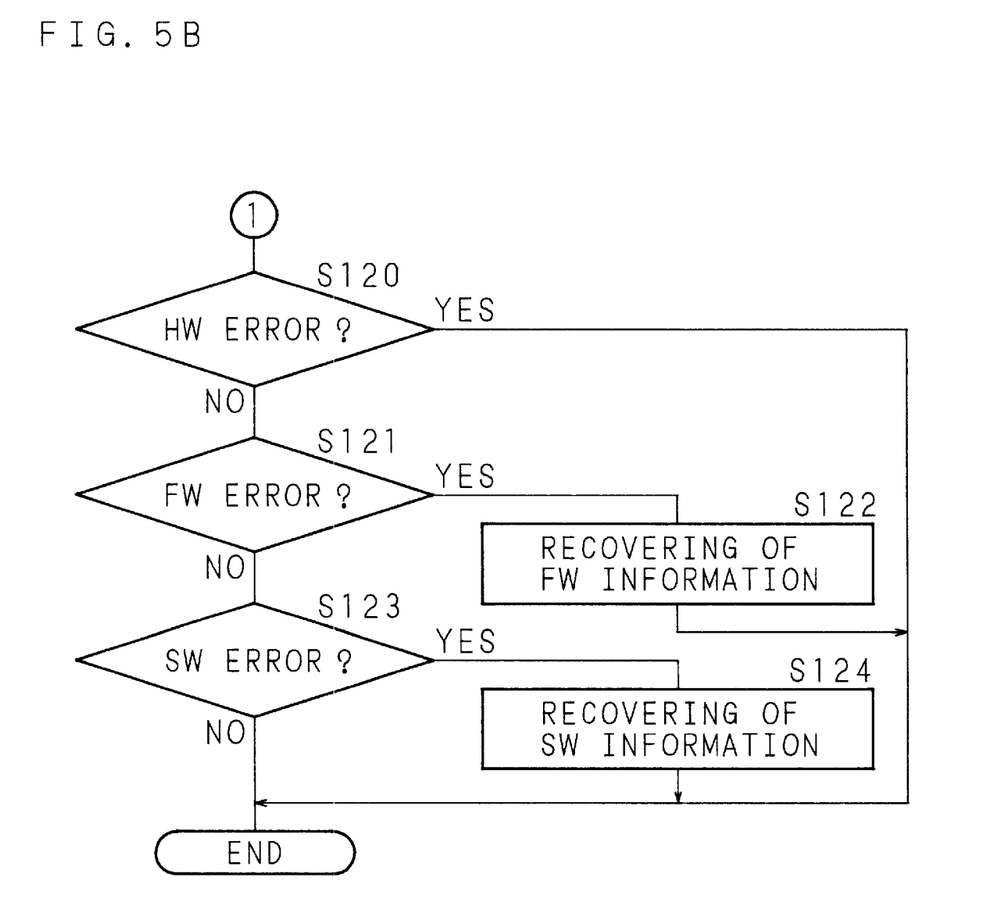
FIG. 5B is a flow chart showing the procedure for the self-maintenance by the computer system according to the present invention.

Next, the processing procedure by software for the purpose of the self-maintenance of the computer system of the present invention is explained with reference to the flow charts of FIG. 5A and FIG. 5B.

When power is put on to activate the computer system 200 of the present invention (Step S111), the software for carrying out the self-maintenance stored in the self-maintenance system file 124 is activated. In this embodiment, it is designed so that the computer system 200 is to carry out the self-maintenance processing at the start by power input, but the start of self-maintenance may be at any time when the maintenance processing is possible, without being limited to the starting time.

First, the computer system 200 carries out a system update diagnosis processing (Step S112). Concretely, the system environment of the computer system 200, i.e., existence or non-existence of change in the files (deletion, new making and change) such as software, firmware, etc. is examined by comparing the system information held by the system information file 123 with the system file 121.

When there is a system update information in the diagnosis in this step S112 (in Step S113, "YES"), concretely, in case of the failure of agreement between the version of the software stored in the system file 121 and the version of the software recorded in the system information file 123, or when the software stored in the system file 121 is not recorded in the system information file 123, the judgment as to whether to carry out the system updating or not is left to the user (Step S114).

Now, when the user gives an instruction to carry out system updating (in Step S114, "YES"), the system update information is written into the system information file 123 before updating to update the file, and likewise the information is send to the backup file 125 before updating and the updated contents are reflected (Step S115). Thereafter, the processing is advanced to the step S116. On the other hand, when the user has given an instruction not to carry out system updating (in Step S114, "NO"), and in case there is no system update information in the system update diagnosis in Step S112 (in Step S113, "NO"), the processing is advanced to the step S116 without carrying out the processing of Step S115 above.

Accordingly, when the system update information exists and in addition the user instructs the updating thereof, the system file 121 not updated is updated by the new system update information, and the condition of the system file 121 after updated is reflected on the backup file 125 not updated. In the case where there is no system update information, and when the user does not desire updating of the system even if there is the system update information, the system file 121 and the backup file 125 are maintained without being updated.

In the step S116, diagnosis processing of hardware (HW), firmware (FW), and software (SW) is carried out. Concretely, diagnosis is made as to whether various hardware constituting the computer system 200 of the present invention, i.e., a CPU, memory, disk unit (hard disk, flexible disk, etc.), printer, display, keyboard, mouse, etc. are in normal state or not. Further, diagnosis is made as to whether any abnormality or change (deletion, new making and change) is found in the system environment of the computer system 200, namely in the files such as software, firmware, etc. or not, by comparing the system information held by the system information file 123 with the contents of the system file 121. In this case, when the user has instructed the updating of the system in Step S114, there arises necessity for maintenance without exception.

According to each diagnosis results as above, judgment is made as to whether the maintenance is necessary or not (Step S117). As a result, when there is neither necessity for system update nor necessity for maintenance (in Step S118, "NO"), the self-maintenance processing by the computer system 200 is terminated to make the system usable immediately. However, when there is a necessity for maintenance (in Step S118, "YES"), in other words, when an error has occurred, it is made as maintenance information (Step S119), and after it is stored in the maintenance information file 122, recovering processing is made according to the kind of the developed error.

First, in the diagnosis in Step S116, when a hardware (HW) error is found to have occurred (in Step S120, "YES"), then the maintenance processing by the self-maintenance system file 124 is terminated at this point, because the hardware error is not self-reparable.

When, in the diagnosis in Step S116, a firmware (FW) error is found to have occurred (in Step S121, "YES"), namely, if it has been judged that there is a change (deletion, new making and change) in the file of the firmware as a result of the comparison of the system information held by the system information file 123 with the contents of the system file 121, then the self-recovering of the firmware is made according to the contents of the backup file 125 (Step S122).

When, in the diagnosis in Step S116, a software (SW) error is found to have occurred (in Step S123, "YES"), namely, if it has been judged that there is a change (deletion, new making and change) in the file of the software as a result of the comparison of the system information held by the system information file 123 with the contents of the system file 121, then, with respect to the self-reparable, e.g., an application software, self-recovering is made according to the contents of the backup file 125 (Step S124).

By the self-maintenance processing as described above, the computer system 200 becomes normally operable in the operable environment, namely, all of hardware, software, and firmware. Additionally, when the user desires in Step S114 to update the system, the system information file 123 and the backup file 125 are updated to a state to be in accord with the present status of the system file 121. However, when the user does not desire the system to be updated in Step S114, the system file 121 is recovered in accordance with the contents of the unupdated system information file 123 and backup file 125. Accordingly, for example, when a user installs a new software or the like for testing, if it is to be used continuously, the user may instruct to carry out system updating in Step S114, or if, for any reason or other, it is desired to reinstate the system to the state prior to the installation of the new software, then the user may designate in Step S114 not to carry out system updating.

As described in detail above, according to the computer system of the present invention, since the computer system per se performs self-diagnosis and prepares the maintenance information, and carries out only the necessary maintenance, the maintenance efficiency is not affected by the system size or the user's ability; the time required for the maintenance is curtailed; and the user's waiting time is shortened.

According to the computer system of the present invention, in case of any change in the operating environment, e.g., in case of a new application program having been installed, when any problem has developed thereby, then the system can be reinstated to the state prior to the installation of the software, and when there is no problem, the program may be used under the new system condition. For this reason, it becomes possible for the user to test handily the alteration of the system condition, thereby realizing a computer which is extremely easy to use.

Furthermore, according to the computer system of the present invention, a computer system possessing both of the effects as described above can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A client/server system in which at least one client unit having software installed in a hardware is connected in separable manner by network connecting means to a network to which at least one server unit is connected, said server unit comprising storing means for storing a backup information of an operating environment of said client unit, and an update information of whole system, and said client unit comprising:

backup data holding means for holding backup data of an operating environment of the unit itself including said hardware and software;

system information holding means for holding an information of the operating environment of the unit itself of the normal state;

diagnosing means for, at a predetermined time, diagnosing the operating environment of the unit itself and said network by comparing them with the information of the normal state held by said system information holding means;

network cutting-off means for cutting off the unit itself from said network when said diagnosing means diagnoses that abnormality has occurred in said network, server unit or network connecting means, and self-maintaining means, when said diagnosing means diagnoses that abnormality has developed in the hardware, for cutting off the unit itself from said network by said network cutting-off means, when said diagnosing means diagnoses that abnormality has occurred in the software and the separation from said network by said network cutting-off means has been made, for self-recovering the operating environment according to the contents of said backup data holding means, and when said diagnosing means diagnoses that abnormality has occurred in the software and the separation from said network by said network cutting-off means has not been made, for self-recovering the operating environment referring to the backup information for said client and system update information stored in said storing means of said server unit.

2. A computer system having software installed in hardware, and being connectable with a network with which another computer is connected, comprising:

backup data holding means for holding backup data of an operating environment of its own including said hardware and software;

system information holding means for holding an information of the operating environment of its own of the normal state;

diagnosing means for, at a predetermined time, diagnosing the operating environment of its own by comparing it with the information of the normal state held by said system information holding means; and self-maintaining means for self-recovering the operating environment according to the content of said backup data holding means when said diagnosing means judges that an abnormality has occurred in the software, and said system is not connected with said network.

3. A computer system, comprising:

backup data holding means for holding backup data of its own operating environment;

system information holding means for holding an information of its own operating environment of the normal state;

diagnosing means for, at an optional time, diagnosing the operating environment of its own by comparing it with the information held by said system information holding means; and self-maintaining means for self-recovering the operating environment according to the content of said backup data holding means applicable only to the part of abnormality when said diagnosing means judges that the abnormality has occurred.

4. A computer system having software installed in hardware, comprising:

software holding means for holding said software;

backup data holding means for holding backup data of an operating environment of its own including said hardware and software;

system information holding means for holding an information of the operating environment of its own;

diagnosing means for, at an optional time, diagnosing the operating environment on its own by comparing it with the information held by said system information holding means;

selecting means for selecting either the not updated state or the after-updated state when said diagnosing means diagnoses that the software is updated; and self-maintaining means for updating the contents of said system file information holding means according to the contents of said software holding means, and updating the contents of said backup data holding means to meet the contents of the updated operating environment when updating of the software is selected by said selecting means, and for self-recovering the operating environment according to the content of said backup data holding means when updating of the system file is not selected by said selecting means.

5. A computer system having software installed in hardware, comprising:

software holding means for holding said software;

backup data holding means for holding backup data of an operating environment of its own including said hardware and software;

system information holding means for holding an information of the operating environment of its own;

diagnosing means for, at an optional time, diagnosing whether or not abnormality has occurred by comparing the operating environment of its own with the information held by said system information holding means, and whether the software is updated or not;

selecting means for selecting either the not updated state or the after-updated state when said diagnosing means diagnoses that the software is updated; and self-maintenance means for updating the contents of said system file information holding means according to the contents of said software holding means, and updating the contents of said backup data holding means to meet the contents of said updated operating environment when updating of the software is selected by said selecting means and said diagnosing means diagnoses that abnormality has occurred, and for self-recovering the operating environment according to the content of said backup data holding means applicable only to the part which necessitates recovering when the updating of said system file is not selected by said selecting means and said diagnosing means diagnoses that abnormality has occurred.

* * * * *